(12) United States Patent
Amaral

(10) Patent No.: US 10,465,363 B2
(45) Date of Patent: Nov. 5, 2019

(54) WATER GENERATING ATMOSPHERE FREEZER

(71) Applicant: Edward Michael Amaral, Riverside, CA (US)

(72) Inventor: Edward Michael Amaral, Riverside, CA (US)

(*) Notice: Subject to any disclaimer, the term of this patent is extended or adjusted under 35 U.S.C. 154(b) by 0 days.

(21) Appl. No.: 15/806,109

(22) Filed: Nov. 7, 2017

(65) Prior Publication Data

US 2018/0127956 A1 May 10, 2018

Related U.S. Application Data

(60) Provisional application No. 62/418,614, filed on Nov. 7, 2016.

(51) Int. Cl.

| *E03B 3/28* | (2006.01) |
| *F25B 1/00* | (2006.01) |
| *F25B 23/00* | (2006.01) |
| *F25B 47/02* | (2006.01) |
| *F25D 11/00* | (2006.01) |

(Continued)

(52) U.S. Cl.
CPC .............. *E03B 3/28* (2013.01); *F25B 1/00* (2013.01); *F25B 23/006* (2013.01); *F25B 47/025* (2013.01); *F25D 11/003* (2013.01); *F25D 17/04* (2013.01); *F25D 21/14* (2013.01); *F25B 2400/141* (2013.01); *F25D 21/08* (2013.01)

(58) Field of Classification Search
CPC ........ F25D 11/003; F25D 21/14; F25D 17/04; F25D 21/08
See application file for complete search history.

(56) References Cited

U.S. PATENT DOCUMENTS

| 2,592,712 A * | 4/1952 | Knoy .................... F25B 27/02 62/101 |
| 3,492,831 A * | 2/1970 | Maurer .................. F25D 3/105 426/524 |

(Continued)

OTHER PUBLICATIONS http://ecoloblue.com/.

(Continued)

*Primary Examiner* — Kun Kai Ma
(74) *Attorney, Agent, or Firm* — Kirk A. Buhler; Buhler & Associates Patenting

(57) ABSTRACT

Improvements to a water generation system is disclosed. The atmosphere freezer to be made from modified, redesigned and rearranged components commonly used in the cryogenics and refrigeration industry but with the focus on generating maximum water from the coil and or panel systems installed inside of a "modified cargo container". The atmosphere freezer is targeted to assist Governments, States and Municipal water districts, aqueducts, U.S. Military, waste water reclamation facilities and reservoir, lake and river municipal managers. Applications can also be used in agriculture and large commercial and or private facilities. This system can also be used in disaster and emergency relief, new or existing housing track developments, solar farms, golf courses, hotels, hospitals, large commercial buildings and universities. Each of these applications can have units designed to meet their needs based on the available space for the container(s) and or their need for water.

20 Claims, 3 Drawing Sheets

(51) Int. Cl.
*F25D 17/04* (2006.01)
*F25D 21/14* (2006.01)
*F25D 21/08* (2006.01)

(56) References Cited

U.S. PATENT DOCUMENTS

| | | | | | |
|---|---|---|---|---|---|
| 3,521,459 | A | * | 7/1970 | Rath | A23L 3/3418 62/78 |
| 3,525,235 | A | * | 8/1970 | Maurer | F25D 3/105 62/223 |
| 3,638,443 | A | * | 2/1972 | Maurer | B60P 3/20 62/52.1 |
| 3,672,183 | A | * | 6/1972 | Bernstein | F25D 16/00 62/139 |
| 3,685,310 | A | * | 8/1972 | Fischer | B01J 8/06 62/114 |
| 3,705,500 | A | * | 12/1972 | Jehle | F25D 3/105 62/223 |
| 4,474,029 | A | * | 10/1984 | Kennon | F25D 21/14 62/275 |
| 4,492,851 | A | * | 1/1985 | Carr | F25D 21/08 165/181 |
| 5,301,516 | A | | 4/1994 | Poindexter | |
| 5,305,825 | A | * | 4/1994 | Roehrich | F25D 29/001 165/61 |
| 5,320,167 | A | * | 6/1994 | Johnson | B60H 1/3202 165/61 |
| 6,022,067 | A | * | 2/2000 | Hargett | B60J 5/08 296/155 |
| 6,202,434 | B1 | * | 3/2001 | Hearne, Jr. | A23B 4/068 62/304 |
| 7,272,947 | B2 | | 9/2007 | Anderson et al. | |
| 8,075,678 | B1 | | 12/2011 | Zerah | |
| 2007/0087681 | A1 | * | 4/2007 | Cook | F24F 11/30 454/256 |
| 2011/0225987 | A1 | * | 9/2011 | Bowdish | F17C 9/04 62/50.3 |
| 2012/0102929 | A1 | * | 5/2012 | Beissler | F01N 13/00 60/297 |
| 2014/0060754 | A1 | * | 3/2014 | Hsieh | A62C 3/14 160/7 |
| 2014/0116077 | A1 | * | 5/2014 | Pierce | B60L 1/02 62/235.1 |
| 2014/0183957 | A1 | * | 7/2014 | Duchesneau | F01K 13/006 307/64 |
| 2015/0330679 | A1 | * | 11/2015 | Bowdish | B60H 1/00014 62/239 |
| 2017/0102178 | A1 | * | 4/2017 | Azzopardi | F25D 13/067 |
| 2017/0292759 | A1 | * | 10/2017 | Al-Hallaj | B60H 1/00014 |

OTHER PUBLICATIONS http://rayagua.com/.
http://airwatergreen.com.
http://islandsky.com/.

* cited by examiner

WATER GENERATING ATMOSPHERE FREEZER

CROSS REFERENCE TO RELATED APPLICATIONS

This application claims the benefit of Provisional Application Ser. No. 62/418,614 filed Nov. 7, 2016 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in generating water. More particularly, the present invention relates to water captured from the atmosphere by means of freezing and defrosting.

Description of Related Art Including Information Disclosed Under 37 CFR 1.97 and 1.98

The drought situation globally and specifically in several U.S. Southwestern regions has been determined by experts to be in a state of emergency. Many articles about the drought problem are easily found online. Many case studies for example on the seriousness of the drought in and around the Southern California, Arizona and Nevada regions require attention to focus on providing a solution for this problem.

Various companies manufacture dehumidification machines. These machines are effective at extracting moisture from the environment in damp or humid regions, by reducing the humidity levels which cause harm to the structure of buildings and or to the products being manufactured within them.

The various dehumidification machines are basically the same as air conditioner systems commonly used every day. These systems generate water which is normally discarded into existing drainage systems.

This process of discarding condensate water occurs everywhere air conditioners are used. There is a potential method to reduce water consumption in existing buildings by storing the condensate water for multiuse. The reuse of condensate water can potentially be implemented in combination with the Atmospheric Refrigeration Corporation's system (ARC system), which are the mobile atmosphere freezer units, described herein.

A large need exists globally, especially in arid regions for a device which counters the drought crisis by generating large quantities of usable water from the atmosphere. The Atmospheric Refrigeration Corporation's system (ARC system) in the proposed disclosure provides a solution to the drought situation.

BRIEF SUMMARY OF THE INVENTION

It is an objective of the atmosphere freezer (ARC System) to modify, rearrange and redesign the use of materials and components used in the cryogenics and refrigeration industry with the focus on generating the maximum amounts of usable water that can be obtained from the atmosphere by intentionally freezing coils and or panels then defrosting them, generating large amounts of clean water from the continual freezing and defrosting of coils and or panels installed inside of a "modified cargo container" that houses the (ARC system).

It is another objective of the (ARC system) for thousands of ARC system units to be incorporated into various U.S. Government agencies in order to assist State and Municipal water districts as well as aqueduct, reservoir, lake and river municipal managers by adding large quantities of clean water into their existing infrastructures for delivery to the public. This system can also be used by agriculture departments, water reclamation facilities, large mining projects, large drilling exploration projects, disaster and emergency relief agencies, new or existing housing track developments, new or existing solar farms, golf courses, hotels, hospitals, large commercial buildings and universities. Each of these applications can have the required amount of (ARC system) installations designed to meet their needs based on their available space for the placement of the container(s) housing the atmosphere freezers.

It is still another objective to provide smaller quantities of the (ARC system) for easy and quick incorporation into small farms, communities or villages in drought stricken or arid regions, where installations with as little as 1 to 10 (ARC system) units can greatly assist in overcoming lack of clean water and or supplement the municipal water available to smaller communities anywhere around the world.

Existing atmospheric water generators produce usable water by integrating equipment commonly used in the air conditioning and refrigeration industry which naturally generates pure water as a by-product from capturing condensation. The water produced through these methods is limited by the amount of relative humidity at any given time per geographical region. The invention of the "atmosphere freezer" devise overcomes the relative humidity limitation as the device is designed to intentionally create large quantities of ice from the accumulation of frost on coils which the devise can achieve at any time or geographical region with relative humidity levels below 5% as opposed to the current technology which requires very high levels of relative humidity of 70% or more and at least 30% relative humidity in order to generate any usable quantities of water from capturing condensate alone.

The objective of creating this device is to generate large quantities of clean usable water from high efficiency atmosphere freezing device(s) that generate frost on coils and or panels inside the device and then melting the frost accumulation on the coils and or panels to generate usable water. The amount of water that can be created daily from this device, can serve and facilitate a permanent solution to any region contending with drought or lack of water, unlike current technology which is limited to the relative humidity in the region.

Various objectives, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
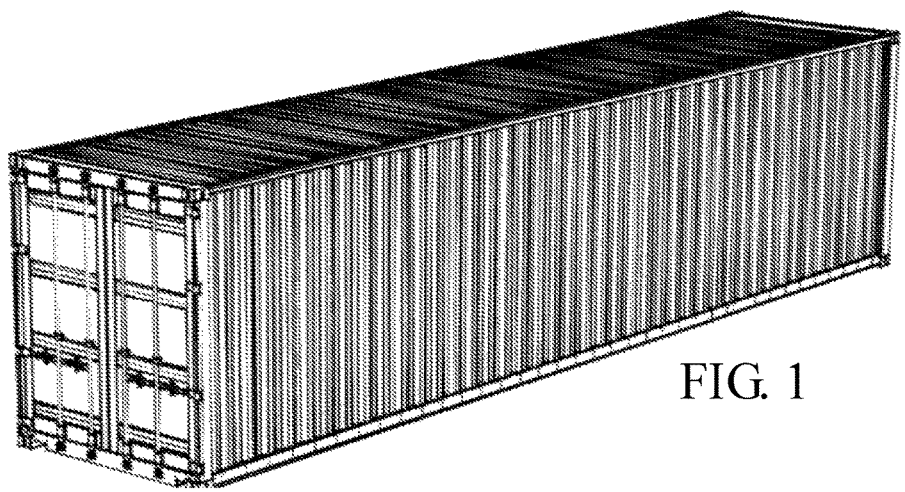
FIG. 1 shows a standard cargo container.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

Item Numbers and Description
20 turbine(s)
21 fan(s)
22 coils and or panels
23 insulated pipes
24 liquid cryogenic storage tank(s)
25 controller and or power inverter
26 condenser and gas refrigerant storage
27 water collection basin
28 drain aperture
29 inclined bottom portion
30 batteries
31 temperature and pressure sensors
32 insulated metal wire element or heat trace
33 structural member(s)
34 generator Current air conditioning coil systems used today in most commercial and industrial buildings prove to generate large amounts of condensate water per day. For example, a 200-ton air conditioning system can produce over 6,000 gallons per day based on regional conditions.

The average results using this calculator can be increased with the (ARC System) to meet the goal of "maximum water creation via freezing and defrosting" instead of cooling a building. Using a calculation for the "outside air" factor dramatically effects water production and is 100% of what the (ARC System) uses to produce water vs only using a small portion of the outside air, as is used with typical air conditioning systems which recycle and condition "interior air".

The data used to calculate the above 6,000 gallons of water per day, was calculated using an outside temperature of 85 degrees F., an inside temperature of 55 degrees F., an outside relative humidity (RH) of 73% and an indoor relative humidity of 50%. These factors are estimated in this application because no indoor air will be used. A 200-ton system was used in this scenario and the outside air that is being used is 100%. This resulting data is another reason why the (ARC System) was invented, to overcome the limitations of relative humidity (RH), as all industry calculations are based on the environment having no less than 30% RH, however with the ARC System, freezing occurs abundantly within RH levels far below 30%, thus freezing and defrosting is much more effective than just capturing the condensate as utilized in other atmospheric water generators.

FIG. 1 shows a standard cargo container that can be used to house and deliver the (ARC system). A 200-ton system can easily be installed inside a 40-foot cargo container. It is further contemplated that additional tonnage can be incorporated into these containers however, much less tonnage will be used to achieve the desired results using the (ARC System) coil and or panel system described herein.

The equipment involved in the process stated above is the same in essence as is used in the cryogenics and refrigeration industry except the unique (ARC System) is intentionally freezing and defrosting the atmosphere on the coils and or panels to generate maximum usable water thereby overcoming the limitations of relative humidity through cryogenics as freezing can occur within minimal RH levels, while maintaining flexibility for delivery to any area around the world via the containerized systems.

Figure 2A:
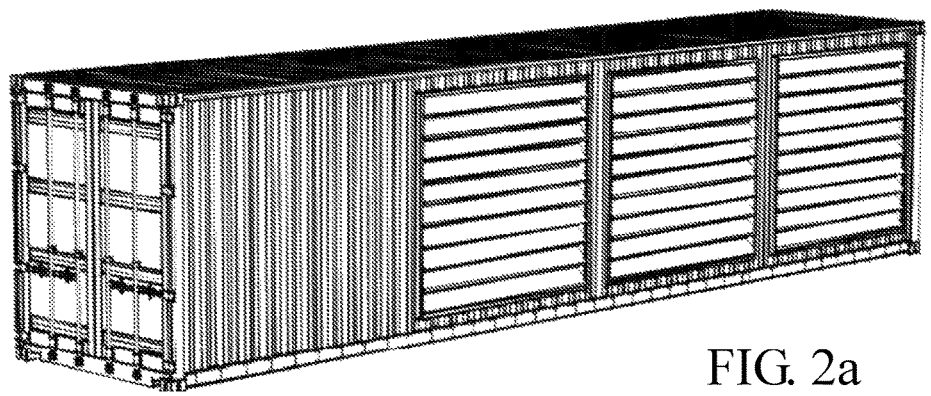
FIG. 2a shows a standard cargo container that has been modified with installation of louvers on the long sides of the container.

FIG. 2a shows a standard cargo container that has been modified with installation of louvers on the long sides of the container.

Figure 2B:
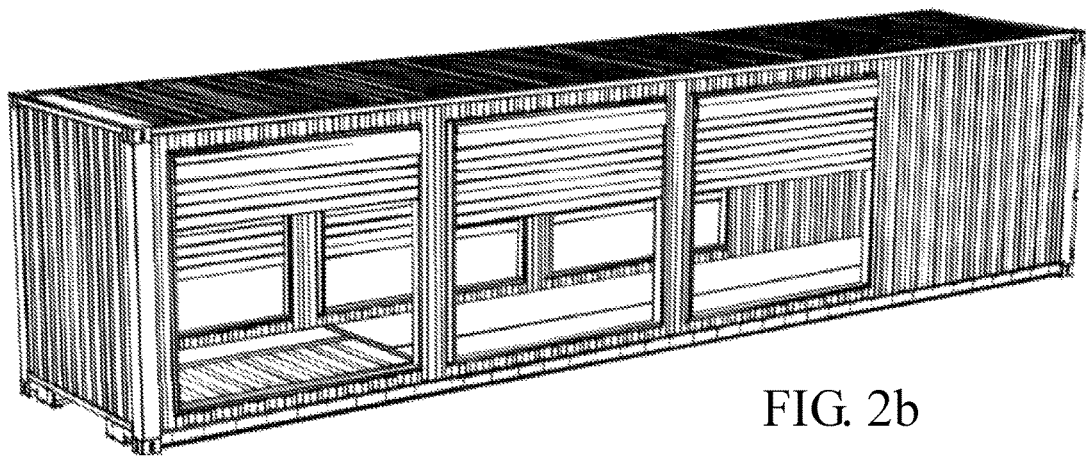
FIG. 2b shows a standard cargo container that has been modified with installation of roll up openings on the long sides of the container.

FIG. 2b shows a standard cargo container that has been modified with installation of roll-up openings on the long sides of the container to allow absorption of the atmosphere and thus freezing of the atmosphere on the coils and or panels which is then defrosted to generate the water. The openings automatically adjust as the system requires to maximize water generation based on sensors which coordinate the activities of the combined components.

The louvers or roll up openings will be divided into several sections across both of the long sides of the container. Each section will open vertically from the top to the bottom of each section of the container to allow for maximum atmospheric air management onto the coil and or panel systems being frozen and defrosted within.

Figure 3A:
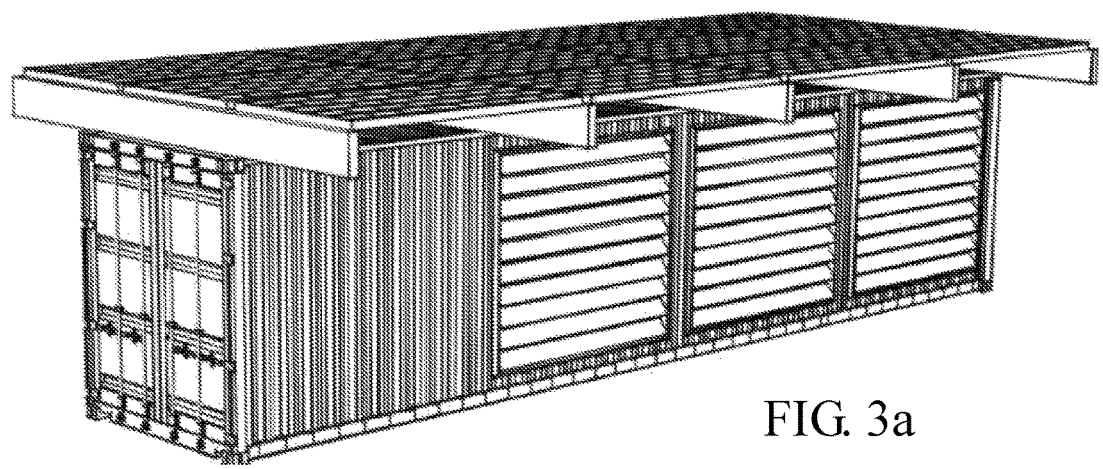
FIG. 3a shows the solar panel array installed on top of the container as is commonly done on top of buildings.

FIG. 3a shows the solar panel array installed on top of the container as is commonly done on top of buildings.

Figure 3B:
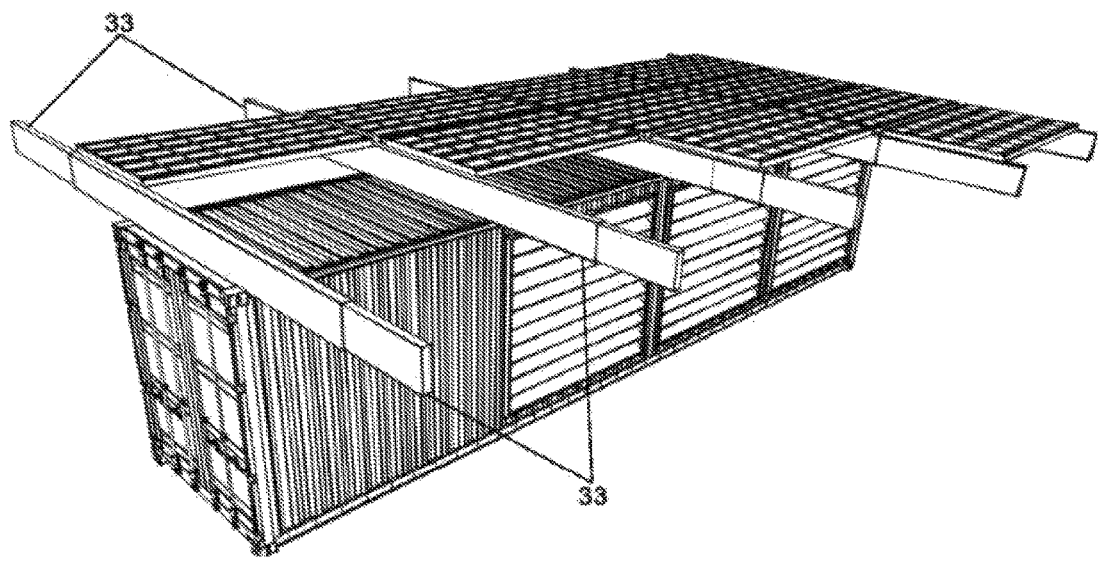
FIG. 3b shows structural member(s) 33 extending out horizontally from the top area of the container as needed to provide a larger area for installation of the solar panels.

FIG. 3b shows structural member(s) 33 extending out horizontally from the top area of the container as needed to provide a larger area for installation of the solar panels. Containers will be installed inline or side by side (as required by the end user's physical location limitations) so various configurations can be designed to suit each end user's location. The solar panel array will act much like a solar farm which can be used as a back-up power source to power the ARC System and or store electricity when sunlight is available or when power from the grid or alternate sources is not available and as an aid to the ARC System turbine generator described herein.

Figure 4A:
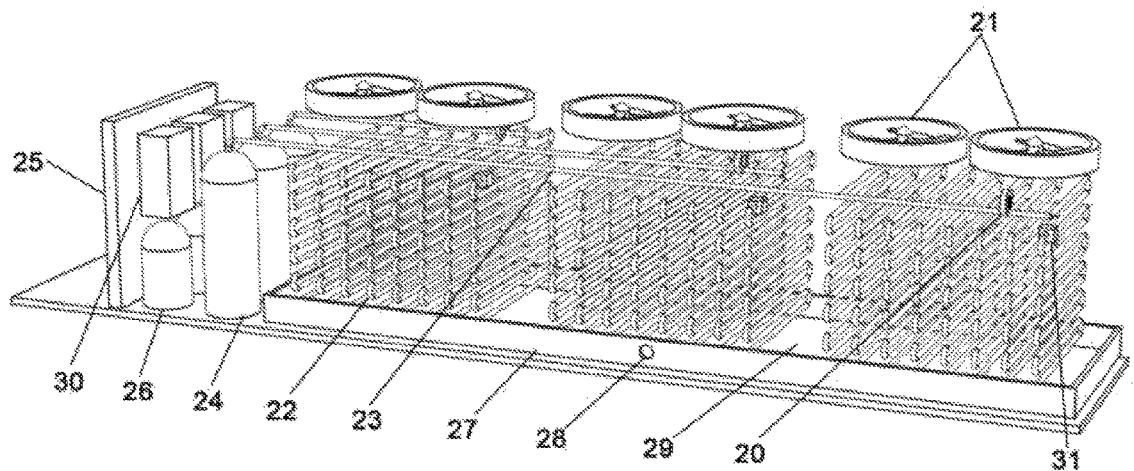
FIGS. 4a and 4b show perspective views of the water generating atmosphere freezer with the side walls removed.
Figure 4B:
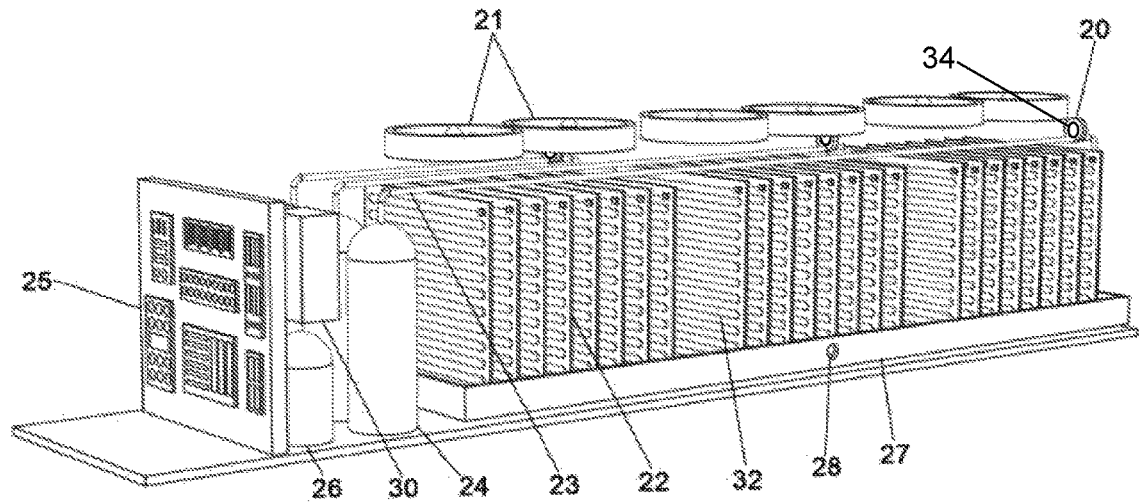

FIGS. 4a and 4b show perspective views of the water generating atmosphere freezer with the side walls removed. This is a semi-closed loop non-compressed cryogen circulating system and or closed loop circulation system of compressed gas refrigerant, both which circulate the cryogen or compressed gas refrigerant through metal coils and or metal panels; alternating in rolls of freezing and heating/defrosting. An insulated metal wire element or heat trace 32 is installed along side of the coils and or panels which is heated by low voltage electrical current as needed to supplement the defrosting process. A turbine 20 is attached to a generator 34 which charges the onboard batteries as needed to ensure adequate electricity to run the entire system. These turbine generators are propelled by the pressurized cryogen or refrigeration gas. Turbine is engaged on or off as needed to generate the electrical current used and to charge the onboard batteries.

These figures show 6 to 12 or more fans 21 installed flush along the top of the container which draw air through the louvered or roll up sides providing the required atmospheric air to maximize freezing on the coils and or panels. The optional solar panel array will be significantly cooled from underneath the solar panels by the fans used to draw the atmosphere into the container which is cooled by default from the air drawn over the frozen coils and or panels which are continually being defrosted. This aspect of the system improves the performance of the solar panel array as heat generation is a major factor that limits solar panel performance. The solar panels generate large amounts of heat from absorption of the suns energy which reduces the panels ability to create electricity. With the cold air cooling the bottom of the panels, the solar panel array's performance and longevity increases.

Operation of the Apparatus

In FIG. 4, the non-compressed cryogen in the insulated pipes 23 moves from the liquid cryogenic storage tank(s) 24 and or closed loop circulation system of compressed gas refrigerant to the coils 22 and or panels which alternate in rolls of cooling or heating depending on the coils and or panels either being frozen or defrosted. The optional solar panel(s) and or turbine generator turbine(s) 20 supply power to a controller and or power inverter 25, commonly used to manage an electrical power supply and or a suitable control means such as an electrical switch, which stores the electricity in batteries 30 either gathered from the internally installed turbine generator and or the solar panel array and or provided from the existing grid for cyclic use by the entire system ensuring zero down time as the batteries are constantly being charged and act in concert with the redundant electrical system. The air management is controlled, using fan 21 motors which drives fan propellers, drawing air across the frozen coils and or panels 22 then exiting the cooled air out of the top of the container to cool the solar panel array above the container.

The coils and or panels continually alternate in functioning as either an evaporator (cooling cycle) or as a condenser and gas refrigerant storage 26 (heating cycle) to eliminate the extra apparatuses typically found in air conditioning and refrigeration systems. Thus, while one bank of coils is freezing, another bank of coils is defrosting using the heat gathered from freezing the adjacent side of the system, creating a semi-closed loop system effectively utilizing the byproducts generated from itself.

The liquid cryogenic storage tank(s) 24 and condenser and gas refrigerant storage 26 tanks, circulates cryogen and or gas refrigerant through insulated pipes 23, where it passes through-an expansion or compression valve, (depending on whether freezing or defrosting is required) then back to the compressor or the liquid cryogenic storage tank(s) 24 to repeat the cycle. The frozen coils draw the moisture from the environment causing the accumulation of ice to develop on the surface of the coils when in the freezing cycle. The frozen coils are then defrosted by sending heated cryogen or gas refrigerant into the frozen coils causing them to melt the ice which just formed on the coils and or panels, the melted ice falls by gravity into a water collection basin 27 underneath the coils and or panels 22. The collected water flows along the inclined bottom portion 29, through the drain aperture 28, which delivers water into pipes connected to the existing waterway(s).

Temperature and pressure sensors 31 are used to regulate the flow of cryogen or refrigerant within the coil 22 and or panel system. This allows the system to automatically regulate the amount of time to freeze or defrost the coils. This invention is intended to maximize the use of the first law of thermodynamics which states energy can only be transformed, never lost or destroyed; such as compressed gas creates heat, while expanded gas creates cold, thus one system performing two functions is an effective use of this law.

Applications of the Invention

These units can be delivered and fully operational within a very short period of time. Depending on the geography or topography of the installation, hundreds of units can be interfaced end to end weekly in various locations, to ultimately create many large-scale installations. ARC Systems are designed as needed per end user, with the geographical factors taken into consideration to maximize the ability of each installation to efficiently create large volumes of water 24 hours a day 365 days a year. The end result being many billions of gallons of clean water being delivered annually into existing waterways for public and/or private use in various locations domestically and abroad.

Another logical application is with our military installations. This system can provide large quantities of clean water for our troops anywhere they are located as well as relocation of the units to another site when needed. The application for mobile water installations is endless. From large mining projects to large agriculture operations.

For example, several hundred units can be installed along the sides of Lake Mead to deliver water back into the reservoir to offset their drought battle. This idea can be duplicated as needed anywhere in the world.

Drought Crisis

Water municipalities and districts are the primary targeted end users as many are facing a very serious water supply crisis and do not have any foreseeable solution at this time. With the ARC system, they will be able to generate water for the public and reduce if not eliminate the burden of water conservancy placed on the public. Desert hotels currently recycle most of the waste water they create. This fact makes desert hotels candidates for systems that make water from the air to supplement their water needs in addition to their recycling efforts.

It is another contemplated embodiment to use internally installed turbines 20 propelled by the cryogen or refrigerant gas. These turbines 20 will be connected to generators 34 similar to the generators used on small windmills which are proven to generate large amounts of electricity when wind conditions permit. The main advantage of the ARC System turbines is that it is not dependent on wind. The turbines are spun by the cryogenic or refrigerant gas continually at a minimum of 22-psi which is the equivalent of external winds of over 60-mph. Turbine generators can be used to charge the batteries and to run the equipment directly when needed. An automated onboard "wide area network" communication device can be incorporated into the ARC systems to ensure reliability and remote management and the servicing of the ARC units.

Thus, specific embodiments of an atmosphere freezer (ARC system) have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An atmosphere freezer comprising:
a cargo container having a size of 10 to 53-foot long;
at least one freezer unit is disposed in said cargo container;
said at least one freezer unit having at least two adjacent independent banks of tubes whereby pressurized cryogen or compressed gas refrigerant is flowed through metal coils or metal panels in at least one of said at least two adjacent independent banks of tubes;
an insulated metal wire element or heat traces are installed on said metal coils or said metal panels;
a turbine is disposed inside of said cargo container and is turned by flowing said compressed gas refrigerant or said pressurized cryogen through at least one of a refrigerant loop circulation system or a cryogen loop circulation system, a solar power collector is disposed on said cargo container whereby said turbine and said solar power collector are electrically wired to said at least one freezer unit; and
wherein when a first independent bank of tubes of said at least two adjacent independent banks of tubes is freezing, a second independent bank of tubes of said at least two adjacent independent banks of tubes is defrosting such that heat gathered from said first independent bank of tubes is used to defrost said second independent bank of tubes; and
a water collection container is disposed under said at least one freezer unit.

2. The atmosphere freezer according to claim 1, wherein at least one side of said cargo container opens thereby allowing air with a higher humidity than the air inside said cargo container to enter said cargo container.

3. The atmosphere freezer according to claim 1, wherein said water collection container accumulates water for delivery into existing waterways or reservoirs.

4. The atmosphere freezer according to claim 1, wherein said cargo container is a mobile cargo container having 40-foot in length and housing said at least one freezer unit with a 200-ton cooling capacity.

5. The atmosphere freezer according to claim 1, wherein said at least one freezer unit accumulates ice from water condensed from air.

6. The atmosphere freezer according to claim 5, wherein said ice is thawed to produce water.

7. The atmosphere freezer according to claim 4, wherein said cargo container has independent sets of roll-up doors.

8. The atmosphere freezer according to claim 7, wherein said roll-up doors are on long sides of said cargo container.

9. The atmosphere freezer according to claim 7, wherein said independent sets of roll-up doors are adjustable based upon a water generation cycle.

10. The atmosphere freezer according to claim 9, wherein said independent sets of roll-up doors are operable based upon cooling and defrosting said metals coils or said metal panels that are disposed in proximity of said independent sets of roll-up doors.

11. The atmosphere freezer according to claim 4, wherein said cargo container has louver openings.

12. The atmosphere freezer according to claim 11, wherein said louver openings are disposed on long sides of said cargo container.

13. The atmosphere freezer according to claim 12, wherein said louver openings are adjustable based upon a water generation cycle.

14. The atmosphere freezer according to claim 13, wherein individual louver openings are operable based upon cooling and defrosting the at least two adjacent independent banks of tubes having metal coils or metal panels that are in proximity of roll-up doors.

15. The atmosphere freezer according to claim 1, wherein said cargo container further includes structural members secured to a top of said cargo container.

16. The atmosphere freezer according to claim 1, wherein said at least one freezer unit is a semi-closed loop non-compressed cryogen circulating system.

17. The atmosphere freezer according to claim 1, wherein said at least one freezer unit is a closed loop circulation system of compressed gas refrigerant.

18. The atmosphere freezer according to claim 1, wherein said at least one freezer unit passes said pressurized cryogen or said compressed gas refrigerant through said metal coils or said metal panels, alternating in cycles of freezing and electrically heating/defrosting between a first one of at least two adjacent independent banks of tubes and a second one of at least two adjacent independent banks of tubes.

19. The atmosphere freezer according to claim 18, wherein said insulated metal wire element or heat traces are installed on said metal panels and provide a supplement defrosting process to said metal panels.

20. The atmosphere freezer according to claim 18, further comprising said turbine attached to a generator to charge batteries, and said turbine is turned by said pressurized cryogen or said compressed gas refrigerant flowing through said metal coils.

* * * * *